W. H. COLLINS & C. E. LONGDEN.
Manufacture of India-Rubber Rings.

No. 140,472.            Patented July 1, 1873.

Wm H. Collins & Chas. E. Longden
Inventor
By Atty.

Witnesses.

UNITED STATES PATENT OFFICE.

WILLIAM H. COLLINS AND CHARLES E. LONGDEN, OF PROSPECT, CONN.

IMPROVEMENT IN THE MANUFACTURE OF INDIA-RUBBER RINGS.

Specification forming part of Letters Patent No. 140,472, dated July 1, 1873; application filed June 4, 1873.

*To all whom it may concern:*

Be it known that we, WILLIAM H. COLLINS and CHARLES E. LONGDEN, of Prospect, in the county of New Haven and State of Connecticut, have invented a new Improvement in Process for Making India-Rubber Rings; and we do hereby declare the following, when taken in connection with the accompanying drawings and the letters of reference marked thereon, to be a full, clear, and exact description of the same, and which said drawings constitute part of this specification, and represent, in—

Figure 1:
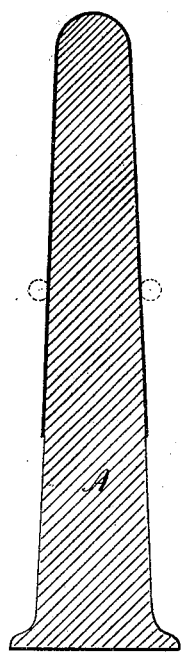
Figure 2:
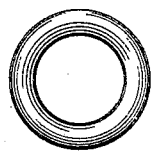

Figure 1, a vertical central section of the former; and in Fig. 2, the ring complete.

This invention relates to an improvement in the manufacture of rings from India rubber or similar gums.

Heretofore these rings have been made by joining the two ends of a piece of rubber, which construction unavoidably shows the seam or place of connection.

The object of this invention is to produce a ring without seams and perfect in all its parts; and it consists in forming the rings from a thin tube of gum, rolling the gum from one end of the tube toward the other until the requisite diameter of the body of the ring is attained, then vulcanizing or otherwise curing the gum.

A is the former, in diameter proportioned to the internal diameter of the ring to be produced. This former is preferably made tapering, and from glass or similar material. This we dip into the gum while in a semi-fluid state, and drawing it therefrom a coating of the gum will adhere to the former. If the first coating be not sufficiently thick we dip again and again until the requisite thickness is attained; one or two dippings will, however, answer the purpose, as it is not desirable that it be much if any thicker than common letter-paper. When the gum has dried sufficiently to allow it to be handled, we open the closed or dipped end of the tube, still on the former, and carefully roll it down the former, rolling the gum upon itself over and over, as denoted by the broken lines in Fig. 1, until the requisite diameter of the body of the ring is attained. The gum adheres to itself, so that when removed from the former the last edge will cling closely to the surface. This is then vulcanized, or cured in the usual manner, and the ring is complete without seam or other disfiguration, as seen in Fig. 2.

We claim as our invention—

The process herein described for manufacture of rings from India rubber or similar gums.

WILLIAM H. COLLINS.
CHARLES E. LONGDEN.

Witnesses:
   A. J. TIBBITS,
   J. H. SHUMWAY.